Patented Apr. 4, 1950

2,502,528

UNITED STATES PATENT OFFICE 2,502,528

HALOGENATED HYDROXYBENZAMIDES OF THE THIAZOLE SERIES AND A PROCESS FOR THEIR MANUFACTURE

Rudolf Morf, Basel, Switzerland, assignor to Sandoz Limited, Basel, Switzerland, a Swiss firm No Drawing. Application December 4, 1946, Serial No. 713,934. In Switzerland December 7, 1945

4 Claims. (Cl. 260—302)

1

The present invention relates to the manufacture of halogenated hydroxybenzamides of the heterocyclic series, the halogen atoms being present in the nucleus of the benzamide group.

Bernheim (Journal of Pharmacology and Exp. Therapeutics 73, 78 (1941)) has stated that 2.3.5-triiodobenzoates have a bacteriostatic action against two stems of tubercle bacilli and that 3.5-diiodo-salicylates possess both bacteriostatic and bactericidal properties.

According to the present invention it has now been found that compounds having appreciably improved growth-inhibiting properties against tubercle bacilli can be prepared by causing hydroxybenzoic acids halogenated in the nucleus or their reactive derivatives containing free or substituted hydroxyl groups to react with heterocyclic amino compounds, if desired, in the presence of diluents or condensation agents and/or catalysts.

As reactive derivatives of hydroxybenzoic acids halogenated in the nucleus there can be used for example acid chlorides, acid azides, acid nitriles, acid amines or acid esters; the amides thus formed can be isolated according to known processes.

The halogen derivatives of the hydroxybenzoic acids used for the interaction may contain one or more similar or different halogen atoms in the aromatic nucleus and may also furthermore be substituted in the hydroxyl group.

Preferably I use the dichloro-, dibromo- and diiodosalicylic acid chlorides which react very well with the heterocyclic amino compounds.

As heterocyclic amino compounds which can be used according to the present invention there can be enumerated: aminothiazoles and their C-alkyl derivatives, aminopyrazolones, aminopyridines, aminopyrimidines and the like.

The reaction between the halogenated hydroxybenzoic acids and the heterocyclic amines is preferably carried out in an inert solvent, like chloroform, dioxane, benzene, ethyl ether and the like. It is also advantageous to neutralize the halogeno acids formed during the reaction by adding to the reaction mixture an acid-binding agent, organic bases being preferably used therefor in view of their solubility in inert solvents. I prefer to use, therefor, bases like ethanolamine, aniline and its N-alkyl derivatives, pyridine and the like or an excess of the heterocyclic amine. Of course the neutralisation of the free acid can also be realized by adding to the reaction mixture for instance sodium carbonate, sodium bicarbonate or sodium acetate or the respective potassium and lithium salts.

2

The new amides prepared in the above described manner can be isolated in the usual manner and can easily be purified by the recrystallisation from suitable organic solvents like ethanol, methanol, dioxane, benzene, glacial acetic acid and the like.

The new amides of the halogenated hydroxybenzoic acids inhibit the growth of tubercle bacilli and are suitable for use as therapeutic agents or as fungicidal compounds.

The following examples may illustrate, but not limit the present invention. In these examples, parts by weight bear the same relationship to parts by volume that grams bear to cubic centimeters.

Example 1

4.0 parts by weight of 2-amino-4-methylthiazole are dissolved in 30 parts by vol. of ether. To this solution there is added, while shaking, a solution of 5.0 parts by weight of 3.5-dibromo-salicylic chloride dissolved in 50 parts by volume of ether, the latter solution being added in three separate portions. The product is then gently boiled under a reflux condenser for 1 hour. It should be noted that the 2-amino-4-methylthiazole is present in an excess. Precipitation of the halogenated amido-compound takes place, the same being then separated off and purified by a repeated recrystallisation from alcohol. The excess of 2-amino-4-methylthiazole used can be recovered (partly in the form of hydrochloride).

The new compound has the empirical formula $C_{11}H_8O_2N_2Br_2S$ and has a melting point of 271° C. (corr.).

Analysis—Calculated: C, 33.7%; H, 2.06%; N, 7.14%. Found: C, 33.82%; H, 2.24%; N, 7.17%.

The 3.5 - dibromo - salicoyl-2-amino-4-methylthiazole possesses the formula:

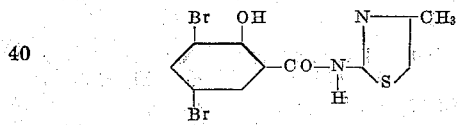

Example 2

14.0 parts by weight of 2-aminothiazole are dissolved in a mixture of 30 parts by volume of chloroform and 14 parts by volume of pyridine. To this solution 9.0 parts by weight of 3.5-dibromo-salicylic chloride previously dissolved in 44 parts by volume of chloroform are added while stirring.

The reaction mixture is boiled under reflux for 2½ hours and then cooled. The precipitate formed is separated from the reaction mixture, then thoroughly washed with water and repeatedly recrystallised from 300 parts by volume of glacial acetic acid. Melting point 260° C. (corr.).

The 3.5-dibromo-salicoyl-2-amino-thiazole

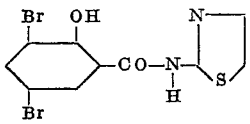

Analysis.—Empirical formula $C_{10}H_6O_2N_2SBr_2$— Calculated: C, 31.74%; H, 1.59%; N, 7.4%. Found: C, 31.9%; H, 1.7%; N, 7.3%.

Example 3

56 parts of weight of 4-amino-antipyrine are dissolved in 10 parts by volume of chloroform. By means of a dropping funnel a solution of 70 parts by weight of 3.5-dibromo-salicylic chloride dissolved in 250 parts by vol. of chloroform is added to the said solution within 15 minutes. The reaction mixture is then heated to boiling under reflux for 3 hours and subsequently cooled. The solvent is partially removed by distillation under a reduced pressure, whereupon the amide crystallises out. After repeated recrystallisation from glacial acetic acid the pure product will be obtained. Melting point 252° C. (corr.).

The 3.5 - dibromo - salicoyl - amino - antipyrine possesses the following formula:

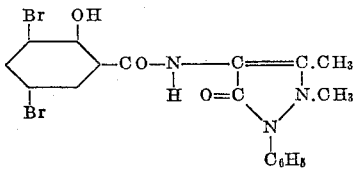

Analysis.—Empirical formula $C_{18}H_{15}O_3N_3Br_2$— Calculated: C, 44.9%; H, 3.1%. Found: C, 44.8%; H, 3.2%.

Example 4

40 parts of weight of 2-amino-4-methylthiazole are dissolved in 60 parts by volume of chloroform. A solution of 50 parts by weight of 3.5-dichlorosalicylic chloride dissolved in 240 parts by volume of chloroform is added thereto. The reaction mixture is boiled under reflux for 2 hours and then cooled. The reaction product then crystallises out. It was separated from the reaction solution, repeatedly washed with water and recrystallised from glacial acetic acid. The crystals formed have a melting point of 274° C. (corr.).

The 3.5-dichloro-salicoyl-2-amino-4-methylthiazole possesses the formula:

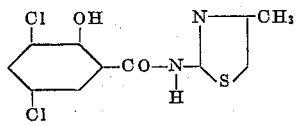

Analysis.—Empirical formula $C_{11}H_8O_2N_2SCl_2$— Calculated: C, 43.6%; H, 2.6%; N, 9.2%. Found: C, 43.69%; H, 2.56%; N, 9.09%.

Example 5

10 parts by weight of 2-aminothiazole are dissolved in a mixture of 40 parts by volume of ether and 10 parts by volume of pyridine. To this solution there is added drop by drop during 20 minutes a mixture of 19 parts by weight of 3.5-dichlorosalicylic chloride dissolved in 115 parts by volume of chloroform. The reaction mixture is then heated to boiling under reflux for 4 hours. A portion of the solvent is distilled off under a reduced pressure, whereupon the reaction product crystallises out. After isolation the reaction product is repeatedly recrystallised from alcohol and dried. Melting point 275° C. (corr.).

The 3.5-dichloro-salicoyl-2-aminothiazole possesses the formula:

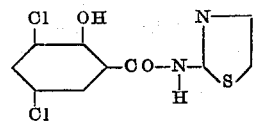

Analysis.—Empirical formula $C_{10}H_6O_2N_2SCl_2$— Calculated: C, 41.5%; H, 2.1%; N, 9.7%. Found: C, 41.75%; H, 2.34%; N, 9.64%.

Example 6

44.5 parts by weight of 2-aminopyridine are dissolved in 45 parts by volume of dry chloroform. To this solution a mixture of 55 parts by weight of 3.5-dibromosalicylic chloride and 250 parts by volume of chloroform is added by means of a dropping funnel with stirring during 15 minutes. Then the resulting mixture is warmed for 3 hours under reflux so that it boils gently, three portions each of 10 parts by volume of pyridine being added thereto. Thereupon a portion of the solvent is distilled off under a reduced pressure, whereupon the 3.5-dibromosalicoyl-2-aminopyridine crystallises out. The crystals are separated from the reaction product and repeatedly recrystallised from alcohol. Melting point 205° C. (corr.).

The 3.5 - dibromo - salicoyl - 2 - amino - pyridine possesses the formula:

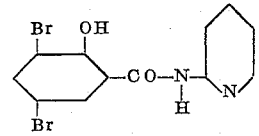

Analysis.—Empirical formula $C_{12}H_8O_2N_2Br_2$— Calculated: C, 38.7%; H, 2.1%; N, 7.5%. Found: C, 38.6%; H, 2.2%; N, 7.55%.

Example 7

33.6 parts by weight of 2-aminopyridine are dissolved in 34 parts by volume of benzene. To this solution there is added during 20 minutes 42 parts by weight of 3.5-dichlorosalicylic chloride dissolved in 300 parts by volume of benzene. The mixture is heated to gentle boiling for 3 hours under reflux, whereupon a portion of the solvent is distilled off under a diminished pressure. The 3.5-dichlorosalicoyl-2-aminopyridine crystallises out and is separated from the reaction product and subsequently repeatedly recrystallised from glacial acetic acid. Melting point 217° C. (corr.).

The 3.5 - dichloro - salicoyl - 2 - amino - pyridine possesses the formula:

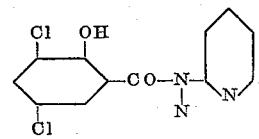

Analysis.—Empirical formula $C_{12}H_8O_2N_2Cl_2$— Calculated: C, 50.9%; H, 2.8%; N, 9.9%. Found: C, 51.1%; H, 2.7%; N, 9.7%.

Example 8

35 parts by weight of 2-amino-4-methylthiazol are dissolved in 55 parts by volume of dry chloroform. To this solution is added under good stirring and by portions a solution of 44 parts by weight of 3.5-diiodo-salicylic chloride dissolved in 220 parts by volume of chloroform. During the addition of the chloride solution the temperature is slowly increased up to 50° C. and the reaction completed by heating under reflux for 3 hours. After cooling, the reaction product precipitated in a fine sandy form is filtered off, washed with water and crystallised from glacial acetic acid. By a repeated recrystallisation from methanol the substance can be purified. The 3.5-diiodosalicoyl-2-amino-4-methylthiazol crystallises in beautiful yellowish prisms melting at 226° C. (corr.).

The 3.5-diiodosalicoyl-2-amino-4-methyl-thiazol possesses the formula

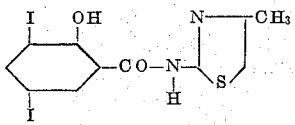

Analysis.—Empirical formula $C_{11}H_8O_2N_2SI_2$—Calculated: C, 27.2; H, 1.6; N, 5.7; I, 52.2%. Found: C, 27.3; H, 1.9; N, 5.7; I, 52.4%.

*Example 9*

20.4 parts by weight of 2-aminopyrimidine are suspended in 200 parts by weight of dry benzene. With good stirring a solution of 44 parts by weight of 3.5-diiodosalicylic chloride dissolved in 150 parts by weight of benzene is added by portions thereto. During the addition of the chloride solution the temperature is increased up to 60° C. and 30 parts by weight of pyridine are then added thereto in 3 portions. The addition of the last portions of the acid chloride and of the pyridine requires about 30 minutes after the beginning of the reaction. The formation of the new product is completed by boiling the charge during 4 hours under reflux, the reaction product being then isolated and recrystallised in the same manner as described in Example 8.

The new 3.5-diiodosalicoyl-2-aminopyrimidine possesses the formula

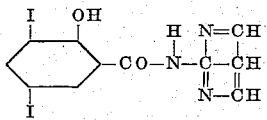

Analysis.—Empirical formula $C_{11}H_7O_2N_3I_2$—Calculated: C, 28.3; H, 1.5; N, 9.0; I, 54.5%. Found: C, 27.9; H, 1.8; N, 8.8; I, 54.0%.

*Example 10*

10 parts by weight of 2-aminothiazol are suspended in 150 parts by weight of dry dioxane. To this suspension is added with good stirring and by portions a solution of 40 parts by weight of 3.5-diiodosalicylic chloride dissolved in 200 parts by weight of dioxane. At the same time are also added 10 parts by volume of pyridine in two portions. After having mixed the reagents together the reaction is completed by boiling at reflux for 3 hours. On cooling down the reaction product precipitates as a fine sandy powder which is filtered, washed with water and purified by repeated recrystallisation from glacial acetic acid and methanol. The new compound crystallises in beautiful yellowish-green prisms melting at 241° C. (corr.).

The 3.5-diiodo-salicoyl-2-amino-thiazol corresponds to the following formula:

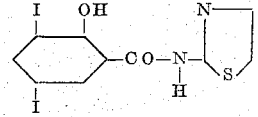

Analysis.—Empirical formula $C_{10}H_6O_2N_2SI_2$—Calculated: N, 5.9; I, 53.9%. Found: N, 5.9; I, 53.6%.

What I claim is:

1. A hydroxybenzamide which corresponds to formula:

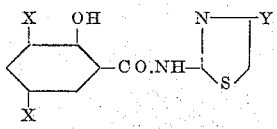

wherein each X stands for the same halogen atom selected from the group consisting of chlorine, bromine and iodine and Y stands for a substituent selected from the group consisting of hydrogen and methyl.

2. The dihalogenated hydroxybenzamide of the formula

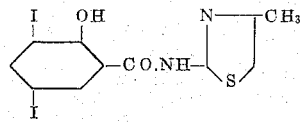

3. The dihalogenated hydroxybenzamide of the formula

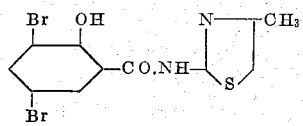

4. The dihalogenated hydroxybenzamide of the formula

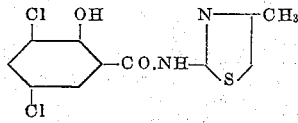

RUDOLF MORF.

REFERENCES CITED

The following references are of record in the file of this patent:

UNITED STATES PATENTS

| Number | Name | Date |
|---|---|---|
| 2,401,522 | Stoll et al. | June 4, 1946 |